(No Model.)  2 Sheets—Sheet 1.

F. MANKEY.
PROCESS OF MANUFACTURING ORNAMENTAL BALUSTERS, POSTS, &c.

No. 340,671. Patented Apr. 27, 1886.

WITNESSES
Gustave Dieterich
Fred Huetwohl

INVENTOR
Frederick Mankey
by Philo Benjamin
Attorney (No Model.) 2 Sheets—Sheet 2.
F. MANKEY.
PROCESS OF MANUFACTURING ORNAMENTAL BALUSTERS, POSTS, &c.

No. 340,671. Patented Apr. 27, 1886.

WITNESSES
Gustave Dieterich
Fred Huetwohl

INVENTOR
Frederick Mankey
by
Park Benjamin Attorney

N. PETERS, Photo-Lithographer, Washington, D. C.

UNITED STATES PATENT OFFICE.

FREDERICK MANKEY, OF WILLIAMSPORT, PENNSYLVANIA.

PROCESS OF MANUFACTURING ORNAMENTAL BALUSTERS, POSTS, &c.

SPECIFICATION forming part of Letters Patent No. 340,671, dated April 27, 1886.

Application filed November 13, 1885. Serial No. 182,681. (No model.)

*To all whom it may concern:*

Be it known that I, FREDERICK MANKEY, of Williamsport, Lycoming county, Pennsylvania, have invented a new and useful Improvement in Processes of Manufacture of Ornamental Balusters, Posts, &c., of which the following is a specification.

My invention relates to a new method of manufacture of ornamental wooden balusters, posts, bars, &c., such as are commonly used in the wood-work of dwellings, furniture, &c. The common mode of cheaply manufacturing these articles involves the use of a lathe having large face-plates, between which plates a number of blanks or blocks roughly formed and intended to be finished are placed so as collectively to form a sort of drum or hollow cylinder. The cutting-tool is applied to the periphery of this drum, the lathe being rotated and the tool being guided in the usual manner to produce the desired pattern. As soon as the entire periphery of the drum is thus cut—which, of course, results in the finishing of the outer face of each blank—the several blanks are separated, and each one is turned on its individual axis to present a new face, and the new faces thus exposed collectively make a new periphery to the drum. The turning operation is then repeated, and in this way all the sides of each blank are successively cut. Inasmuch as the face-plates are of large radius, it follows that posts having three or more sides may thus be produced; but the sides of these posts necessarily will not be perfectly flat, but only approximately so, being in fact of like curvature to that of the periphery of the face-plates, so that when it is desired to make these surfaces accurately true some additional planing is necessary.

By means of my present process the use of the lathe as above described is wholly obviated. No skill, such as is required of a lathe attendant, is necessary. I can produce ornamental balusters or posts more cheaply, more rapidly, and with less waste of material than has hitherto been possible; and I can make them with equal facility from varieties of wood which, from their irregular and coarse grain, are very difficult to work in the lathe with any degree of finish and smoothness.

Figure 1:
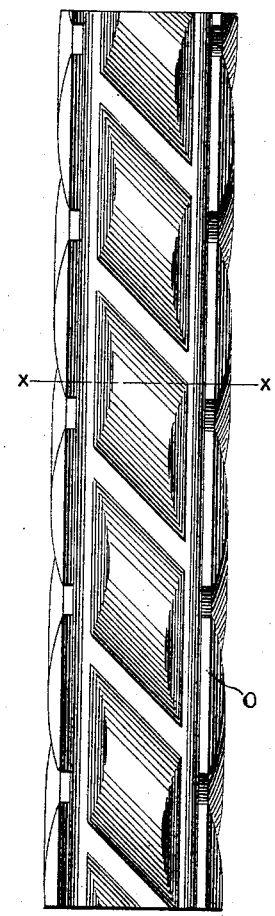
Figure 3:
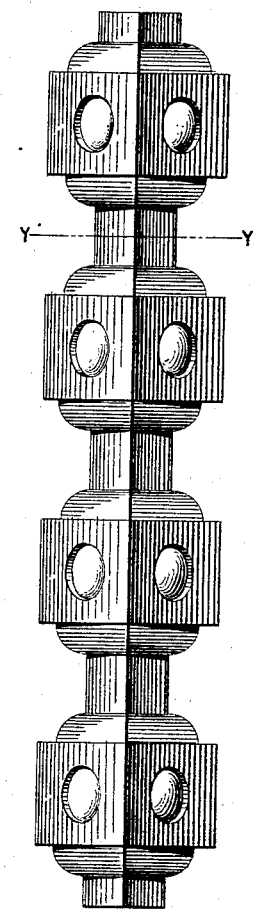
Figure 2:
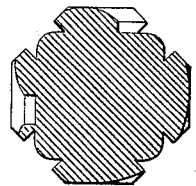
Figure 4:
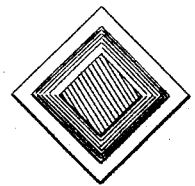
Figure 5:
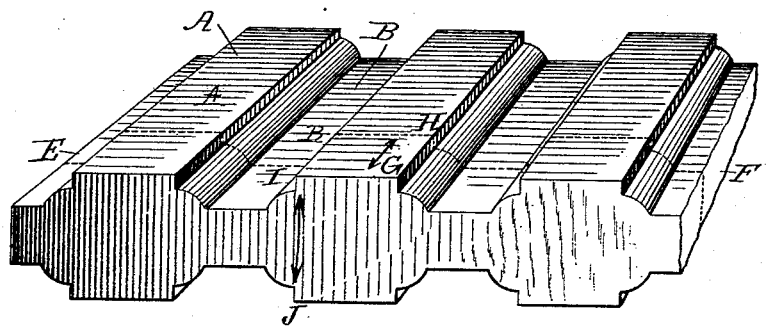
Figure 6:
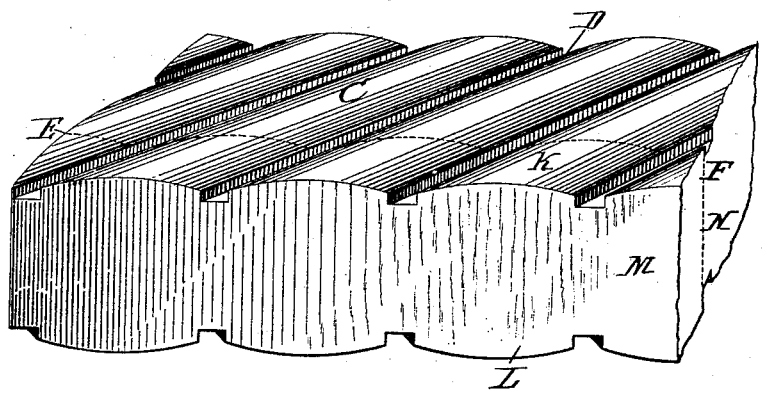
Figure 7:
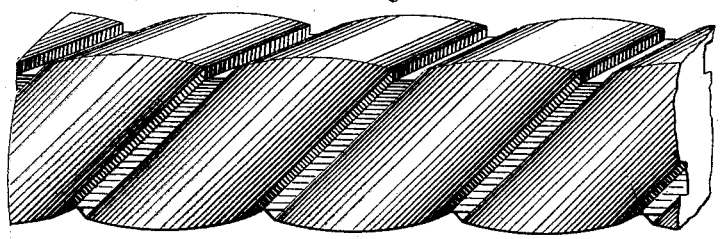

Referring to the accompanying drawings, in Figures 1 and 3 I show two of the many forms of ornamental balusters or posts which can be produced by following my process. Fig. 2 is a transverse section of Fig. 1 on the line $x\ x$. Figs. 6 and 7 show different stages in the process of manufacture of the post shown in Fig. 1. Fig. 4 is a transverse section of the post, Fig. 3, on the line $y\ y$. Fig. 5 illustrates the mode of manufacture of this form of post.

I take a board or plank of wood of a thickness equal to the greatest transverse dimension of the intended post. Upon the surface of this board I produce a new configuration—such as is shown in Fig. 5 or Fig. 6. In Fig. 5, this configuration consists of elevations A and depressions B, which stand transversely across the board—that is, at right angles to the grain, which naturally runs longitudinally. In Fig. 6 the elevations C and depressions D are disposed diagonally to the direction of grain. It is essential that the elevations and depressions be produced by cross-cutting the grain; but whether they stand at right angles thereto, as in Fig. 5, or diagonally thereto, as in Fig. 6, is not material, and simply depends upon the design desired. After one side of the board is thus cross-cut I form corresponding elevations and depressions on the opposite side. When both sides are thus treated, the board appears as in Fig. 6 or 5. I then cut the board longitudinally into strips, as indicated by the dotted lines E F in Figs. 5 and 6. When the post is intended to have all four of its sides of equal surface area, I make the width G H of each strip equal to the thickness I J of the board.

Referring more particularly to Fig. 6, when the strip is cut off, as above described, it has two sides, K L, with elevations and depressions, and two sides, M N, flat. On the flat sides M N, I produce by cross-cutting, as before, the same configuration that is on the sides K L. The post, after this is done, appears as in Fig. 7, and is finished. In order, however, to impart a more ornamental appearance, I may, by the aid of a molding-machine, form beads O on the corners, and bevel off the ends of the elevations; but this is simply a matter of fancy.

Referring to Fig. 5, the process of manufacture is the same. After the strip is cut off the two flat sides are cross-cut, and the completed post appears as in Fig. 3. The circular figures on the elevations or any other ornament may be added.

I claim—

The process of making ornamental many-sided bodies, substantially as herein set forth, which consists in first producing upon a board or plank a new configuration of elevations and depressions disposed at an angle to the direction of grain of said board; second, dividing said board longitudinally into strips; third, producing on the flat faces of said strips a new configuration analogous to that already formed on said strips.

FREDERICK MANKEY.

Witnesses:
C. F. MANKEY,
L. GRIENEISM.